2 Sheets—Sheet 1.
J. A. SHULL.
Combined Hay Loader and Press.
No. 222,206. Patented Dec. 2, 1879.
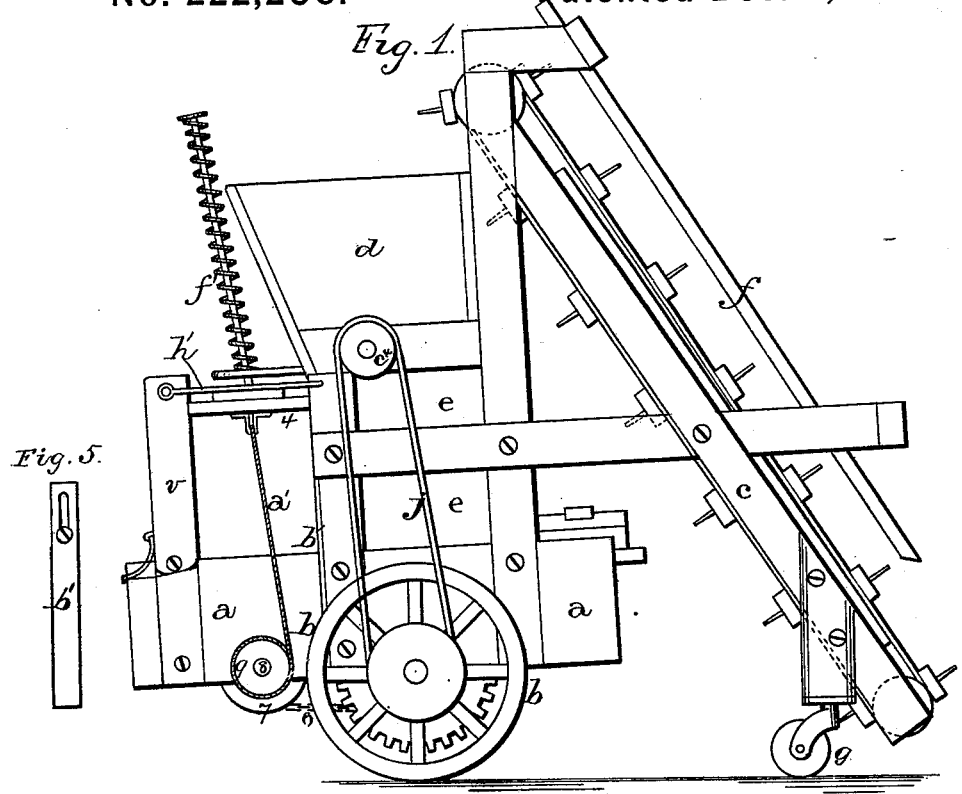
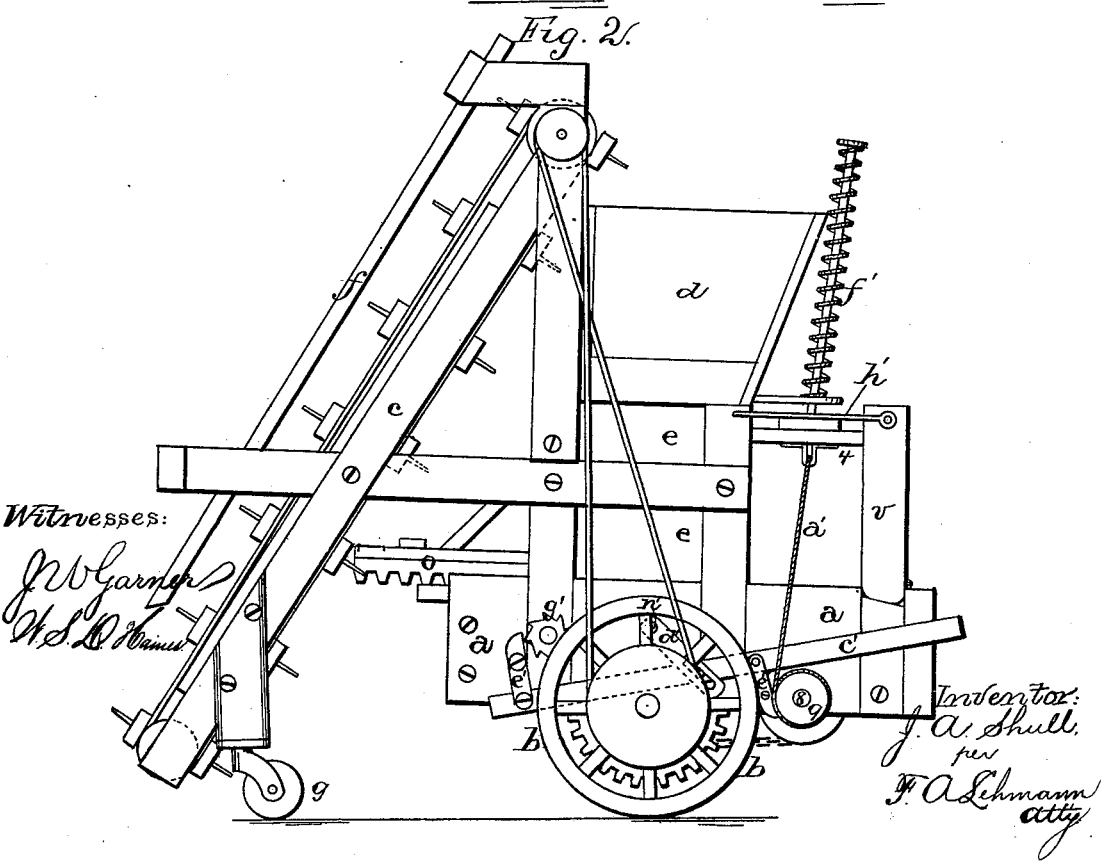

J. A. SHULL.
Combined Hay Loader and Press.
No. 222,206. Patented Dec. 2, 1879.
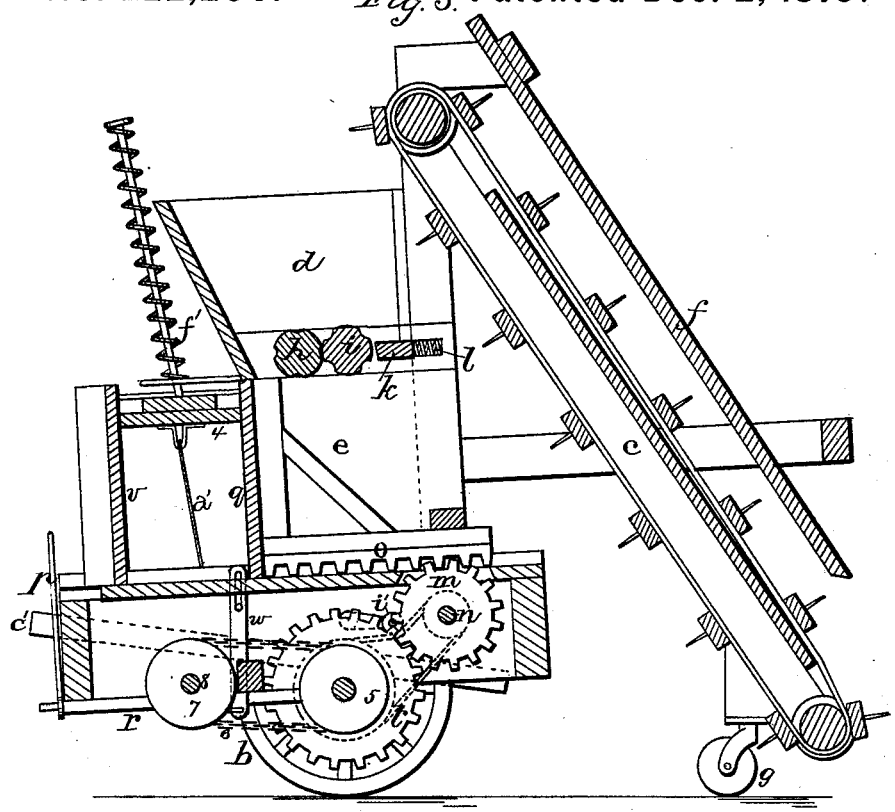
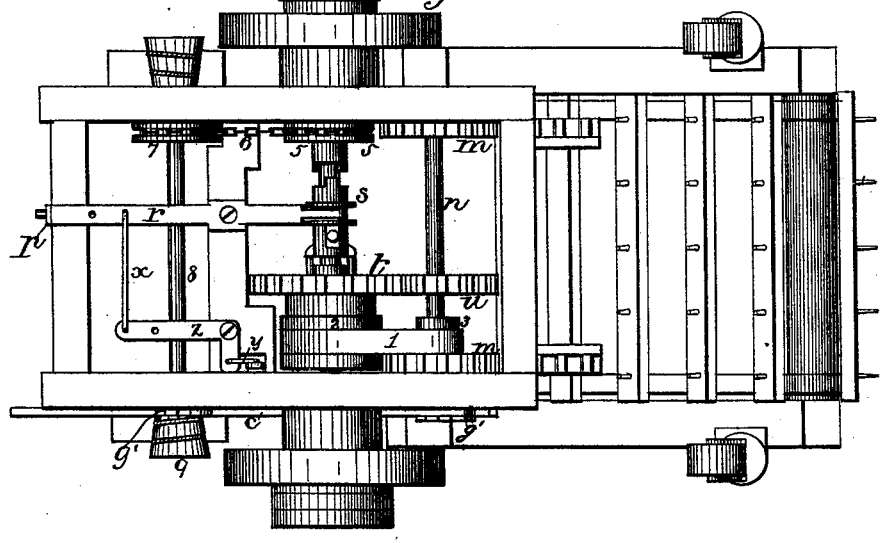
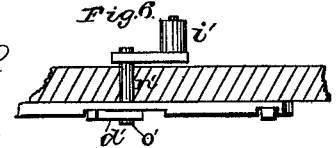

UNITED STATES PATENT OFFICE.

JOHN A. SHULL, OF DUNCANNON, PENNSYLVANIA.

IMPROVEMENT IN COMBINED HAY LOADER AND PRESS.

Specification forming part of Letters Patent No. 222,206, dated December 2, 1879; application filed May 13, 1879.

*To all whom it may concern:*

Be it known that I, JOHN A. SHULL, of Duncannon, in the county of Perry and State of Pennsylvania, have invented certain new and useful Improvements in Combined Hay Loader and Press; and I do hereby declare the following to be a full, clear, and exact description of the invention, such as will enable others skilled in the art to which it pertains to make and use it, reference being had to the accompanying drawings, which form part of this specification.

My invention relates to an improved hay loader and press combined; and it consists in the arrangement and combination of parts, that will be more fully described hereinafter, whereby the hay is gathered up as it lies in the field, carried up and dropped into a hopper on top of the press, and is then baled as the machine is drawn along.

Figures 1 and 2 are side elevations taken from opposite sides. Fig. 3 is a vertical section of the same. Fig. 4 is an inverted view, and Figs. 5 and 6 are detail views.

$a$ represents a stout rectangular frame, which is supported upon the two driving-wheels $b$. Upon the front of the machine is secured the hay-loader $c$, which gathers up the cut hay as it lies upon the ground, and carries it up and drops it down into the hopper $d$ on top of the baling-chamber $e$. Over the top of this elevator is placed the cover $f$, which prevents the hay from being blown away, and which enables the hay to be carried up more readily. The lower end of this elevator is supported upon the two wheels $g$, and, in connection with the endless apron here shown, there may be used rake-teeth, or other similar devices if so preferred, for gathering the hay ready to be elevated.

Between the hopper and baling-chamber are journaled the two corrugated rollers $h$ $i$, the one $h$ being held stationary against any endwise or lateral movement, and made to revolve by a belt, $j$, which runs up from a pulley on one end of the axle, while the one $i$ not only has a rotary motion, but is pushed against the other by the board $k$ and spring $l$. This board and spring, by keeping the two rollers pressed together, cause them to revolve in opposite directions, and thus force all of the hay which drops upon them down into the chamber below, and at the same time allow the roller $i$ to adjust itself to the amount of hay passing between them.

Projecting up through the bottom of the floor of the baling-chamber are the two cog-wheels $m$, which are placed on the shaft $n$, and which mesh with the two racks $o$ on the front side of the follower $q$. This follower $q$ closes one side of the baling-chamber while the hay is being fed in to form a bale; but after it has been moved backward, as shown in Fig. 3, and the bale formed, it closes the rear end of the chamber and leaves the front end open.

When it is desired to form a bale of the hay in the baling-chamber, the hand-lever $p$ on the rear end of the machine is moved to one side, which causes the lever $r$ under the machine to throw the double-ended clutch $s$, which moves back and forth on the axle, into gear with the cog-wheel $t$. This wheel $t$ turns loosely on the axle; but when in gear with the clutch it turns with the axle and operates the shaft $n$ and its two wheels $m$, through the wheel $u$, and thus forces the follower $q$, by means of the racks $o$, backward, so as to compress the hay that was in the baling-chamber back against the hinged board $v$. While this compression is taking place the belt $j$ is moved outward upon the loose pulley $c^4$, so as to stop the two rollers, and thus any more hay is prevented from being fed down into the chamber, and hence the hay accumulates in the hopper until after the bale being formed is disposed of, when it is again fed into the chamber.

The forward motion of the machine causes the follower to be forced backward into the position shown in Fig. 3, when the follower strikes against the slotted lever $w$, which is pivoted upon the frame and connected at its lower end by the link $y$ with the cranked lever $z$, and this lever $z$ is connected at its rear end, by the rod $x$, with the lever $r$, that shifts the clutch $s$ back and forth. As the follower strikes against the lever $w$ it forces it backward, and through the intermediate parts throws the clutch out of gear, so as to instantly stop the follower, when the lever $c'$ is brought into play, so as to prevent the follower from moving forward, as will be more fully described hereinafter.

To move the follower $q$ forward after the bale has been finished, the belt 1, which passes around pulleys 2 and 3, is brought into play, when the follower is moved back to the front end of the chamber again. The rollers $h$ $i$ are brought into action again, and the hay is again fed into the chamber.

After the follower $q$ has been moved backward its full distance, as already described, so as to compress the hay against the hinged board $v$, the bale has been compressed but one-half, and the follower 4 on top of the partially-compressed bale is then brought into play by moving the double-ended clutch $s$ into gear with the sprocket-wheel 5 on the axle. This wheel 5, through the chain 6, operates a similar wheel, 7, on the shaft 8, which shaft has a grooved pulley, 9, on each end.

Fastened to the under side of each end of the follower 4, and to each of these pulleys, is a rope or chain, $a'$, which, as the shaft 8 is revolved, draws the follower 4 down upon the top of the already partially-formed bale, until the bale is compressed to any desired degree. In order to regulate the amount of this compression any suitable gage, like the one $b'$, may be used.

When the long lever $c'$, which is fastened to one side of the frame by the slotted hanger $d'$, and the two pivoted dogs $e'$, are moved endwise, so as to cause both of the dogs to engage with the ratchets $g'$, one of which is on the end of the shaft $n$, and the other on the shaft 8, both of the shafts are locked so that they cannot revolve. By this means both followers will be held rigidly in place, when the usual wires or ties may be fastened around the bale. This done, the lever is moved so as to disengage the dogs from the ratchets, when the spring $f'$ instantly draws the follower 4 upward. The rods $h'$, which hold the pivoted board $v$ in place, are then loosened, the board turned back, and the bale rolled off on the ground.

As the belt 1 and the cog-wheel $t$ are only alternately brought into play, the belt is made so slack that it does not operate the pulleys, except when the tightener $i'$ is brought into play for that purpose.

On the outer side of the long lever $c'$ there is made a projection, $o'$, which catches in the slot in the lower end of the hanger $d'$. The upper end of this hanger is fastened to a shaft, $n'$, which has the tightener secured to its inner end. When the lever $c'$ is moved endwise so as to move the dogs out of contact with the pawls, this tightener is forced against the belt, and the belt is then made to move the follower $q$ back into position again. When the lever is moved so as to make the dogs engage with the pawls, the tightener is moved away from the belt, and the shaft $n$ is rigidly locked in place, so that the two cog-wheels will lock the racks, and thus assist the stop in holding the follower $q$ against the compressed hay.

Although the two followers are here shown as being alternately brought into play, it is evident that they may be both brought into play at once.

I do not limit myself to the precise construction of any of the operating parts here shown, as they may be slightly varied without departing from the spirit of my invention.

Both of the driving-wheels are provided with ratchets in their hubs, so that the machine can be backed without operating the machine.

Having thus described my invention, I claim—

1. In a combined hay-loader and baling-press, the combination of an elevating device, $c$, for raising the hay, a hopper, $d$, to receive the hay, and a feeding mechanism located between the hopper and the baling-chamber, whereby the hay may be fed into the chamber or allowed to accumulate in the hopper, substantially as described.

2. In a combined hay-loader and baling-press, the combination of an elevator, $c$, a hopper, $d$, a baling-chamber, and the two followers $q$ and 4, moving at right angles to each other, each follower being provided with a mechanism for alternately bringing them into play, substantially as set forth.

3. In a combined hay loader and press, the combination of the follower $q$, levers $w$, $z$, and $r$, and clutch $s$, with the lever $c'$, dog $e'$, and ratchet $g'$, whereby the follower is thrown out of gear and locked in place, substantially as specified.

4. In a combined hay loader and press, the combination of the follower $q$, a mechanism that is operated by the forward motion of the machine for moving the follower against the hay, a mechanism for automatically throwing the clutch out of gear and stopping the follower, and a mechanism for locking the follower in place, substantially as shown.

5. In a combined hay press and loader, the follower 4, moving at right angles to the one $q$, and provided with a mechanism for drawing it down upon the bale after it has been partially formed, and a mechanism for locking it in place, substantially as described.

In testimony that I claim the foregoing, I have hereunto set my hand this 22d day of April, 1879.

JOHN A. SHULL.

Witnesses:
W. S. D. HAINES,
J. W. GARNER.